March 20, 1956  A. D. HILL  2,738,990
CONDUIT BOX (EXDENTER TYPE)
Filed June 9, 1953
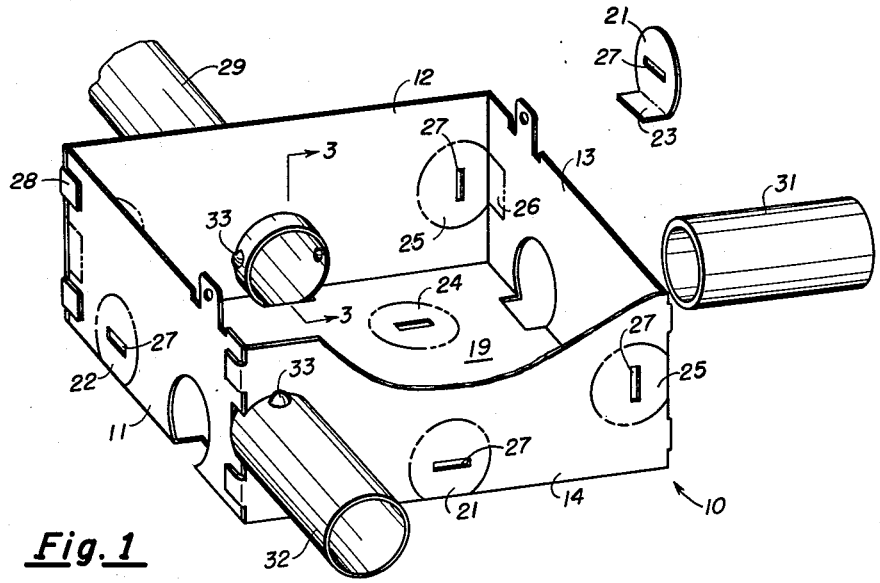
Fig. 1
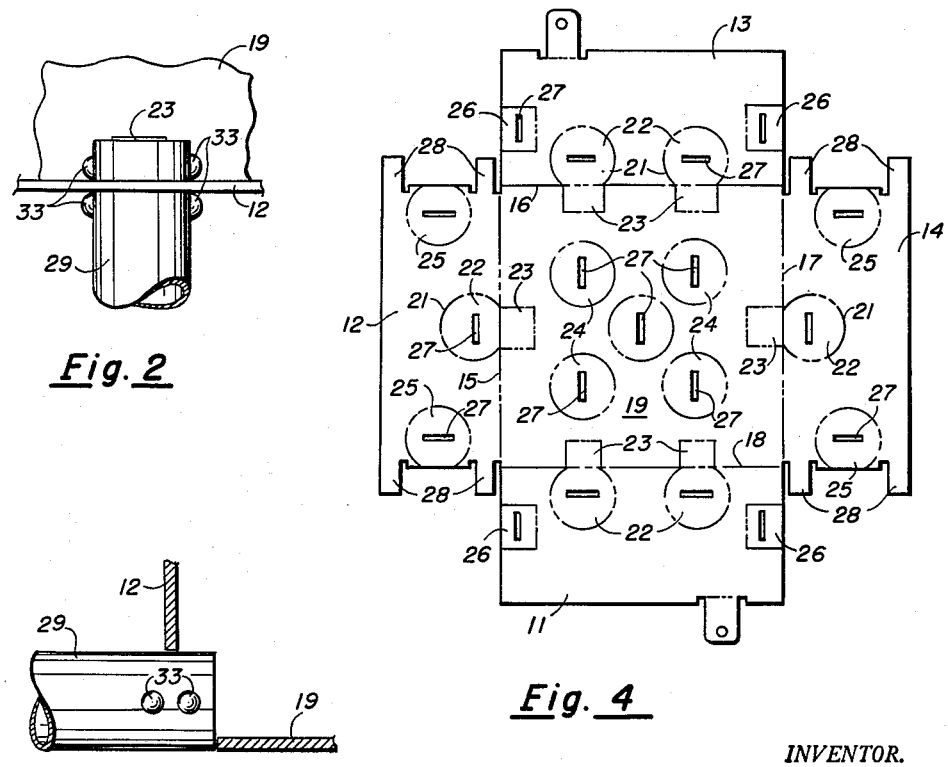
Fig. 2
Fig. 3
Fig. 4
INVENTOR.
ARLIE D. HILL
BY George Sipkin
George E. Pearson
ATTORNEYS United States Patent Office 2,738,990
Patented Mar. 20, 1956

2,738,990

CONDUIT BOX (EXDENTER TYPE)

Arlie D. Hill, San Diego, Calif.

Application June 9, 1953, Serial No. 360,623

2 Claims. (Cl. 285—24.5)

(Granted under Title 35, U. S. Code (1952), sec. 266)

The invention described herein may be manufactured and used by or for the Government of the United States of America for governmental purposes without the payment of any royalties thereon or therefor.

This invention relates to electrical distribution systems and more particularly to a flush entrance outlet box for use with electrical wiring and pipe conduits.

Many forms of outlet and junction boxes have been provided for use with pipe conduits in conjunction with electrical wiring, but these have required expensive fittings for attachment of the pipe conduit to the box and required the formation of offsets adjacent the box where it was desirable to run the pipe conduit flush along a wall or on the surface to which the junction box was attached. This made the use of such boxes expensive and time-consuming, and running wire through the offsets and junction boxes was difficult and required the use of snakes or other means for pulling the wire through the offset portions of the pipe conduit.

In one preferred form of the present invention a simple, inexpensive and secure means is provided for securing the pipe conduit to a junction or outlet box which is so constructed that the surface of the pipe conduit is flush with the outer surface of the bottom wall of the junction box. The conduit outlet box consists essentially of the box formed from a sheet of metal with the sides bent upwardly and interlocked to form a box-like structure. Prior to bending up the sidewalls a plurality of keyhole-shaped openings are formed or partially severed from the sheet material, and the knockout piece so formed is provided with a pry-out slot to facilitate removal. Each of the openings or knockout pieces has a circular portion in the side wall with a contiguous, rectangular portion in the bottom wall or adjacent end wall of the box which adjoins at the meeting line of the side and bottom walls. When the sheet material is folded up into the box-like structure, the opening formed or provided by removal of the knockout piece extends across the bent edge so that the pipe conduit will extend through the circular portion with one part of its peripheral portion extending into the rectangular part of the opening so that the surface of the pipe conduit is flush with the bottom of the box. The pipe conduit is exdented on both sides of the side wall of the box and at opposite sides of the circular portion of the opening by use of a suitable tool inserted in the end of the pipe conduit to securely retain the conduit in position in the opening.

One object of the present invention is to provide a conduit outlet or junction box which will permit the straight through entrance of the pipe conduit into the box with the outer surface of the pipe conduit and the bottom surface of the box flush with the surface against which both are attached.

A further object of the present invention is to provide a novel form of metal blank for forming a conduit junction or outlet box which permits the flush entrance of the pipe conduit therein with respect to either the bottom wall or one or more of the side walls thereof.

Still another object of the present invention is to provide a novel method of attaching a pipe conduit to a junction or outlet box in a secure manner and flush with one of the walls thereof.

Other objects and many of the attendant advantages of this invention will be readily appreciated as the same becomes better understood by reference to the following detailed description when considered in connection with the accompanying drawings wherein:

Fig. 1 is a pictorial view of a junction box made up in accordance with one preferred embodiment of the present invention and showing two conduits secured in position therein;

Fig. 2 is a fragmentary view of a portion of the box shown in Fig. 1 on a larger scale and illustrating the method of securing the pipe conduit in position;

Fig. 3 is a sectional view taken along the line 3—3 of Fig. 1; and

Fig. 4 is a plan view of a sheet metal blank as cut before bending to form the box illustrated in Fig. 1.

Referring now to the drawings in detail, the completed junction or outlet box 10, as illustrated in Fig. 1, is made up from the blank of Fig. 4 by bending up the side walls 11, 12, 13 and 14 along the bend lines indicated at 15, 16, 17 and 18 at right angles to the bottom wall 19.

A plurality of knock-out pieces 21 are preferably formed in the sheet metal blank by a punch cut which partially severs the piece 21 so that it may be subsequently removed when desired to form a suitable opening. Each of the knockout pieces 21 is provided with a circular portion 22 on one side of the bend lines 15, 16, 17 or 18, and a rectangular portion 23 formed in the bottom wall 19 on the opposite side of the bend lines. Other circular knockout pieces 24 may be formed in the bottom wall if desired. Additional knockout pieces 25 of substantially circular form may be formed in the edges of the sidewalls 12 and 14 and complementary rectangular knockout pieces 26 formed in the adjacent portions of the side walls 11 and 13.

Each of the knockout pieces is preferably provided with a pry-out slot 27 in which a screwdriver bit may be inserted to facilitate removal of the particular knockout piece where it is desired to insert a conduit.

The side walls 12 and 14 are also provided with a plurality of tabs 28 which are adapted to be welded to the end side walls 11 and 13 when the side walls are bent up to form a box. It will be obvious that the sizes of the openings may be made to receive any desired size of pipe conduit, and, if desirable, more than one size or shape could be provided in a single conduit box.

The use of the junction or outlet box 10 in conjunction with a pipe conduit 29 is clearly illustrated in Fig. 1 wherein the pipe conduit is inserted through the opening formed by removal of one of the knockout pieces 21 in the side wall and is retained in position by exdenting or expanding the pipe conduit 29 as shown at 33 on opposite sides of the opening and at diametrically opposite points as is more clearly illustrated in Figs. 2 and 3. Pipe conduit 31 is shown in a position where it is about to be inserted in the opening formed by removal of one of the knockout pieces 21 in the side wall 13.

Another pipe conduit 32 is shown inserted in the opening formed by removal of the circular knockout piece 25 and rectangular knockout piece 26 in the side wall 14 and side wall 11 respectively so that the pipe conduit 32 will lay flush with a wall or other surface perpendicular to the bottom wall 19 against which the side wall 11 may abut. It will be obvious that the junction or outlet box 10 may be arranged in many different ways with respect to one or more surfaces against which it may be secured and along which the pipe conduits are adapted to run, and in each instance the pipe conduit and junction box will be flush with the surfaces against which they are mounted with no offsets required.

The exdenting of the pipe conduit will securely retain the pipe conduit in position on the conduit box as illustrated in Fig. 2 by the formation of at least two pips 33 closely spaced to the wall of the conduit box and preferably formed on diametrically opposite sides of the pipe conduit. The exdenting operation is readily performed by use of a tool such as that disclosed in the co-pending application by the same inventor, Serial No. 365,300, filed June 30, 1953.

The illustration of Fig. 3 clearly shows how the pipe conduit fits within the opening formed by removal of the knockout piece with the circular pipe conduit extending through the circular opening formed by removal of the circular portion 22 and with its outer portion seated in the recess formed by the removal of the rectangular portion 23.

The knockout pieces 21, 24, 25 and 26 may be completely severed from the blank if desired, during fabrication; however, this is usually not desirable, since it leaves the junction or outlet box open to dust and moisture, if any one or more of the openings thus formed is not utilized and closed by a conduit inserted therein. It will also be apparent that the openings may be suitably formed to any desired size and shape to fit the particular type conduit being utilized in conjunction therewith.

Obviously many modifications and variations of the present invention are possible in the light of the above teachings. It is therefore to be understood that within the scope of the appended claims the invention may be practiced otherwise than as specifically described.

What is claimed is:

1. A flush entrance outlet box including adjoined and mutually perpendicular first and second walls, said first wall having an outer and inner surface, said second wall having an outer and inner surface, said first wall having an open sided aperture in said first wall opening toward said second wall, said aperture being defined by the surface of a cylinder tangent to the outer surface of said second wall and intersecting the plane of the inner surface of said second wall along lines spaced apart substantially less than the diameter of said cylinder, said second wall having an open ended rectangular slot opening toward said first wall, said slot having an end wall and a pair of side walls respectively containing said lines, a cylindrical hollow conduit received in said aperture and slot and having an end abutting the end wall of said slot, said conduit extending through said aperture and having an external diameter equal to the diameter of said cylinder, the external surface of said conduit being interfittingly engaged with the cylindrical surface of said aperture whereby the external surface of said conduit is tangent to the plane of the outer surface of said second wall and said conduit is securely held by said first wall against movement in all directions in the plane of said first wall and is held against axial movement in one direction parallel to said second wall by abutment of said end of said conduit with said end wall of said slot, said conduit having outwardly extending pips abutting said inner surface of said first wall to hold said conduit against axial movement in the other direction parallel to said second wall.

2. An outlet box and conduit as in claim 1, wherein the conduit wall thickness between the inner and outer surfaces of said conduit is equal to the thickness between the inner and outer surfaces of said second wall whereby the inner surface of said conduit is tangent to and flush with the inner surface of said second wall.

References Cited in the file of this patent

UNITED STATES PATENTS

| 277,427 | Recht | May 8, 1883 |
| 1,901,943 | Adell | Mar. 21, 1933 |
| 1,928,761 | Newman | Oct. 3, 1933 |
| 2,016,284 | Knight | Oct. 8, 1935 |
| 2,179,248 | Bandish | Nov. 7, 1939 |
| 2,625,288 | Clark | Jan. 13, 1953 |